Figure 1:
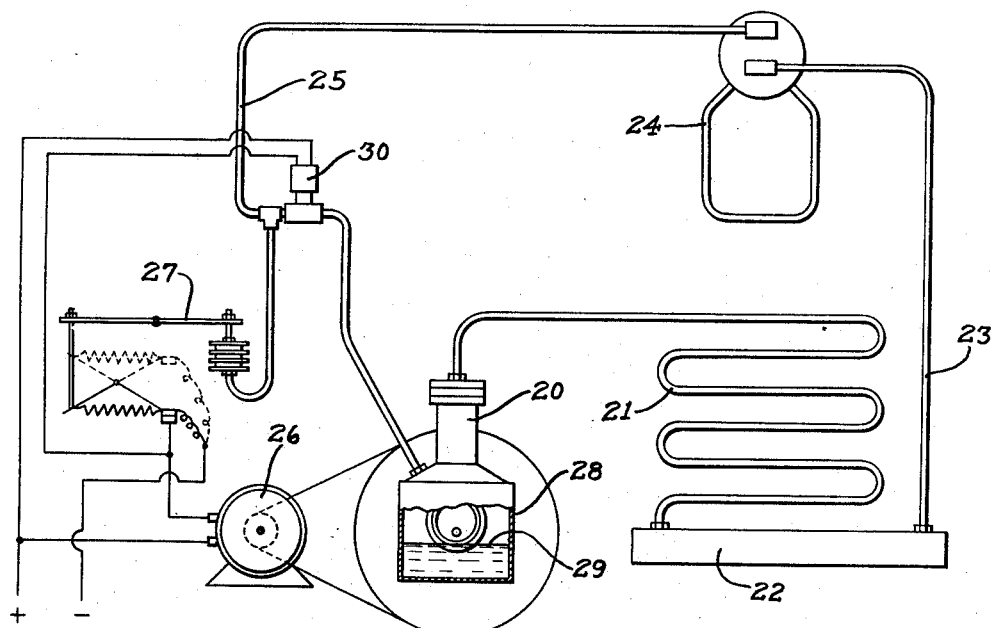

March 23, 1937. H. M. WILLIAMS 2,074,526
REFRIGERATING APPARATUS
Filed April 30, 1934

Inventor
Harry M Williams
By Spencer Hardman and Fehr
Attorneys

Patented Mar. 23, 1937

2,074,526

UNITED STATES PATENT OFFICE 2,074,526

REFRIGERATING APPARATUS

Harry M. Williams, Dayton, Ohio, assignor to General Motors Corporation, Dayton, Ohio, a corporation of Delaware Application April 30, 1934, Serial No. 723,144

7 Claims. (Cl. 62—4)

This invention relates to refrigerating apparatus and more particularly to refrigerating systems in which the compressor lubricant reservoir is located in the low pressure portion of the refrigerating system.

In refrigerating systems considerable difficulty is encountered because the lubricant tends to absorb the refrigerant to a greater or less extent depending on the particular refrigerant and lubricant employed.

In absorbing refrigerant, the lubricant becomes diluted and if a sufficient amount of refrigerant is absorbed, the lubricating qualities of the lubricant may be impaired to such an extent that the compressor may be damaged because of the poor lubrication. This tendency is peculiarly acute where the refrigerant and lubricant are completely miscible or mutually soluble in all proportions, since in this situation, the lubricant will absorb refrigerant and continue to absorb refrigerant until it absorbs a considerable amount of the refrigerant in the system. This absorption is greater when the refrigerant pressure is greater and this absorption is also greater when the temperature of the lubricant is lowered.

Where the lubricant reservoir of the compressor is in communication with the low pressure portion of the refrigerating system, this lubricant tends to absorb refrigerant to a considerable extent during the idle periods of the refrigerating system since at this time the compressor tends to cool and also because the refrigerant pressure in the low pressure portion tends to rise during the time the compressor is idle. This is particularly true when the refrigerating system is shut down for a considerable period of time.

When the compressor starts after such an idle period, it lowers the refrigerant pressure within the lubricant reservoir causing the absorbed refrigerant within the lubricant to evaporate and form foam within the lubricant reservoir. This foam composed of lubricant and liquid and evaporated refrigerant is drawn into the compression chamber of the compressor through the inlet valve thereof. The lubricant portion of the foam is practically incompressible and when the piston of the compressor attempts to force this lubricant out of the compression chamber, the discharge valve designed for vapor compression only, are insufficient in capacity to permit the discharge of such a quantity of liquid. This lubricant is therefore trapped into the compression chamber, which causes knocking of the compressor and is forced out through the discharge opening ofttimes by upturning or damaging the discharge valve mechanism.

It is an object of my invention to materially reduce this absorption of refrigerant by the lubricant by isolating the lubricant reservoir from the remainder of the refrigerating system during idle periods thereof so as to prevent the refrigerant pressure within the lubricant reservoir from rising.

It is a more specific object of my invention to control this shutting off lubricant reservoir from the remainder of the system by the electric switch which is employed to control the operation of the compressor driving motor.

Further objects and advantages of the present invention will be apparent from the following description, reference being had to the accompanying drawing, wherein a preferred form of the present invention is clearly shown.

Figure 2:
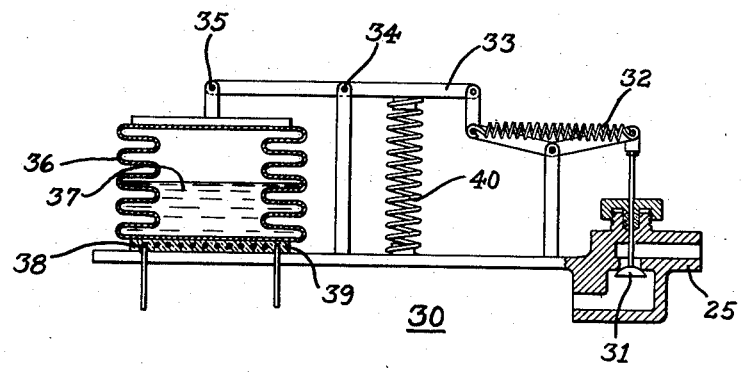

In the drawing:

Fig. 1 is a diagrammatic view of a refrigerating system embodying my invention; and Fig. 2 is a diagrammatic view of the electrically controlled valve means employed for isolating the lubricant reservoir from the remainder of the refrigerating system during idle periods of the compressor.

Referring to the drawing and more particularly to Fig. 1 there is shown a compressor 20 for compressing the refrigerant and for forwarding the compressed refrigerant to the condenser 21 where the compressed refrigerant is liquefied and collected in a receiver 22. From the receiver 22 the liquid refrigerant is forwarded through a supply conduit 23 to a refrigerant evaporating means 24 which may be of the familiar float controlled flooded type. The evaporator means 24 absorbs heat from the medium to be cooled and the liquid refrigerant evaporates therein and is returned to the compressor through the suction conduit 25. The compressor 20 is driven through suitable pulley and belt means by an electric motor 26 which is controlled by a snap acting switch means 27, operated by the pressure within the return conduit 25. Since the pressure within the switch conduit 25 corresponds to the evaporating pressure and temperature within the evaporating means 24, the switch means 27 is operated according to the temperature of the evaporating means 24. The suction conduit 25 connects directly into the lubricant reservoir 28 which is located within the lower portion of the compressor which forms the crank case. In this form of compressor the refrigerant is drawn from the crank case by the compressor and pumped into the condenser. Inasmuch as the refrigerant passes through the lubricant reservoir the lubricant 29 within the reservoir is exposed at all times to refrigerant. The amount of absorption depends upon the particular refrigerant and lubricant employed.

When only partially miscible refrigerants and lubricants are employed, such as when sulphur dioxide is used as a refrigerant, and oil as a lubricant, there is a definite limit to the amount of absorption under ordinary operation. When completely miscible refrigerants and lubricants are employed such as when a refrigerant such as methyl chloride or difluorodichloromethane is used as a refrigerant with oil as a lubricant, there may be excessive absorption of the refrigerant by the lubricant and the absorption even during the ordinary idle periods of the compressor may be considerable if no means are provided for protecting the lubricant during this period. The absorption of refrigerant by the lubricant dilutes the lubricant and under such circumstances may dilute the lubricant sufficiently to seriously impair its lubricating qualities and to cause serious foaming troubles. In order to reduce this dilution of lubricant and to prevent foaming I provide a valve 30 in the suction conduit 25 between the connection for the pressure operating switch 27 and the compressor 20. This valve 30 is controlled by the switch 27 so that it closes the suction conduit 25 during the idle periods of the compressor. In order to do this, this electrically controlled valve 30 is connected in parallel electrical circuit relation with the compressor driving motor 26 but in series with the switch contact of the snap acting switch 27.

Preferably this valve is of the electrothermal type and is shown diagrammatically in Fig. 2. In this figure the suction conduit 25 is provided with a valve 31 which is connected by a toggle snap acting mechanism 32 to a lever 33 which is pivoted at 34 and connected by a pin connection 35 at its opposite end to the movable end of the metal bellows 36. The metal bellows 36 is charged with a volatile liquid 37 such as a refrigerant and is provided with an electric heater 38 which is imbedded in an electrically insulating heat conducting material 39, which is fastened in heat exchange relation with the bottom of the metal bellows 36.

When the compressor driving motor 26 and the compressor 20 are in operation, the electric current passes through the electric heater 38 and heats and vaporizes the volatile liquid to create a pressure within the metal bellows 36 to pivot the lever 33 in a clockwise direction in order to move the valve 31 to the open position so as to permit refrigerant to flow through the suction conduit 25. When the compressor driving motor 26 and the compressor 20 are stopped by the opening of the snap acting switch 27, the volatile liquid within the metal bellows 36 returns to its liquid state, reducing the pressure therein, and the metal bellows contracts so that the lever 33 is moved in a counter-clockwise direction to close the valve 31. This counter-clockwise movement on lever 33 may be assisted by a compression spring 40 which tends to turn the lever in a counter-clockwise direction about its pivot point 34.

By this system the rise in the temperature and pressure of the refrigerant evaporating means 24 will not be transmitted through the suction conduit 25 to the lubricant reservoir 28 because of the closing of the suction conduit by the valve 31 during the idle period of the compressor. The compressor valves seal the lubricant reservoir from the high pressure position of the system. In this way the lubricant reservoir 28 will be isolated during the idle period of the compressor and the refrigerant pressure therein will thus be prevented from rising and increases in the absorption of the refrigerant will thereby be prevented.

While the form of embodiment of the invention as herein disclosed, constitutes a preferred form, it is to be understood that other forms might be adopted, all coming within the scope of the claims which follow.

What is claimed is as follows:

1. Refrigerating apparatus including a refrigerant evaporating means and a refrigerant liquefying means for supplying liquid refrigerant thereto and for withdrawing evaporated refrigerant therefrom, said refrigerant liquefying means having a compressor and an electric motor for driving the compressor, said compressor having a refrigerant inlet, a refrigerant outlet and a lubricant reservoir containing a lubricant miscible with the refrigerant, an electric switch for controlling the operation of the compressor driving motor, and an electrically actuated valve for controlling the flow of refrigerant through said compressor inlet.

2. Refrigerating apparatus including a refrigerant evaporating means and a refrigerant liquefying means for supplying liquid refrigerant to and for withdrawing evaporated refrigerant from the evaporating means, said liquefying means having a compressor and a suction conduit connecting the compressor with the evaporating means, said compressor having a lubricant reservoir containing lubricant miscible with the refrigerant, said lubricant reservoir communicating with said suction conduit, said liquefying apparatus including an electric motor for driving the compressor, an electric switch means for controlling the operation of the compressor driving motor, and valve means controlled by said electric switch for preventing the flow of refrigerant through the suction conduit while the compressor is idle.

3. Refrigerating apparatus including a refrigerant evaporating means and a refrigerant liquefying means for supplying liquid refrigerant to and for withdrawing evaporated refrigerant from the evaporating means, said liquefying means having a compressor and a suction conduit connecting the compressor with the evaporating means, said compressor having a lubricant reservoir containing lubricant miscible with the refrigerant, said lubricant reservoir communicating with said suction conduit, said liquefying apparatus including a motor for driving the compressor, means for controlling the operation of the compressor driving motor, and valve means controlled by said control means for preventing the flow of refrigerant through the suction conduit while the compressor is idle.

4. Refrigerating apparatus including a refrigerant evaporating means and a refrigerant liquefying means for supplying liquid refrigerant to and for withdrawing evaporated refrigerant from the evaporating means, said liquefying means having a compressor and a suction conduit connecting the compressor with the evaporating means, said compressor having a lubricant reservoir containing lubricant miscible with the refrigerant, said lubricant reservoir communicating with said suction conduit, said liquefying apparatus including a motor for driving the compressor, and valve means for automatically preventing or permitting refrigerant flow through the suction conduit when the compressor stops and starts, respectively, said valve means being controlled concurrently with the motor.

5. Refrigerating apparatus including a refrigerant evaporating means and a refrigerant liquefying means for supplying liquid refrigerant thereto and for withdrawing evaporated refrigerant therefrom, said refrigerant liquefying means having a compressor and an electric motor for driving the compressor, said compressor having a refrigerant inlet, and a refrigerant outlet, an electric switch for controlling the operation of the compressor driving motor in accordance with the temperatures produced by said evaporating means, and a snap acting valve for stopping the flow of refrigerant through said compressor inlet, when the compressor is idle.

6. Refrigerating apparatus including a refrigerant circuit comprising a refrigerant evaporating means and a refrigerant liquefying means for supplying liquid refrigerant to and for withdrawing evaporated refrigerant from the evaporating means, said apparatus having a lubricant reservoir communicating with the refrigerant circuit and containing lubricant miscible with the refrigerant, means for controlling the operation of the liquefying apparatus and valve means controlled by said control means for isolating said lubricant reservoir from the remainder of the refrigerant circuit while the liquefying means is idle.

7. Refrigerant apparatus including a refrigerant circuit comprising a refrigerant evaporating means and a refrigerant liquefying means for supplying liquid refrigerant to and for withdrawing evaporated refrigerant from the evaporating means, said apparatus having a lubricant reservoir communicating with the refrigerant circuit and containing lubricant miscible with the refrigerant, and snap acting valve means for isolating said lubricant reservoir from the remainder of the refrigerant circuit while the liquefying means is idle.

HARRY M. WILLIAMS.